April 6, 1943. R. W. THOMAS 2,315,881
HIGHER VAPOR PRESSURE FUEL SYSTEM AND COMBINATION CARBURETOR
Filed Sept. 9, 1941
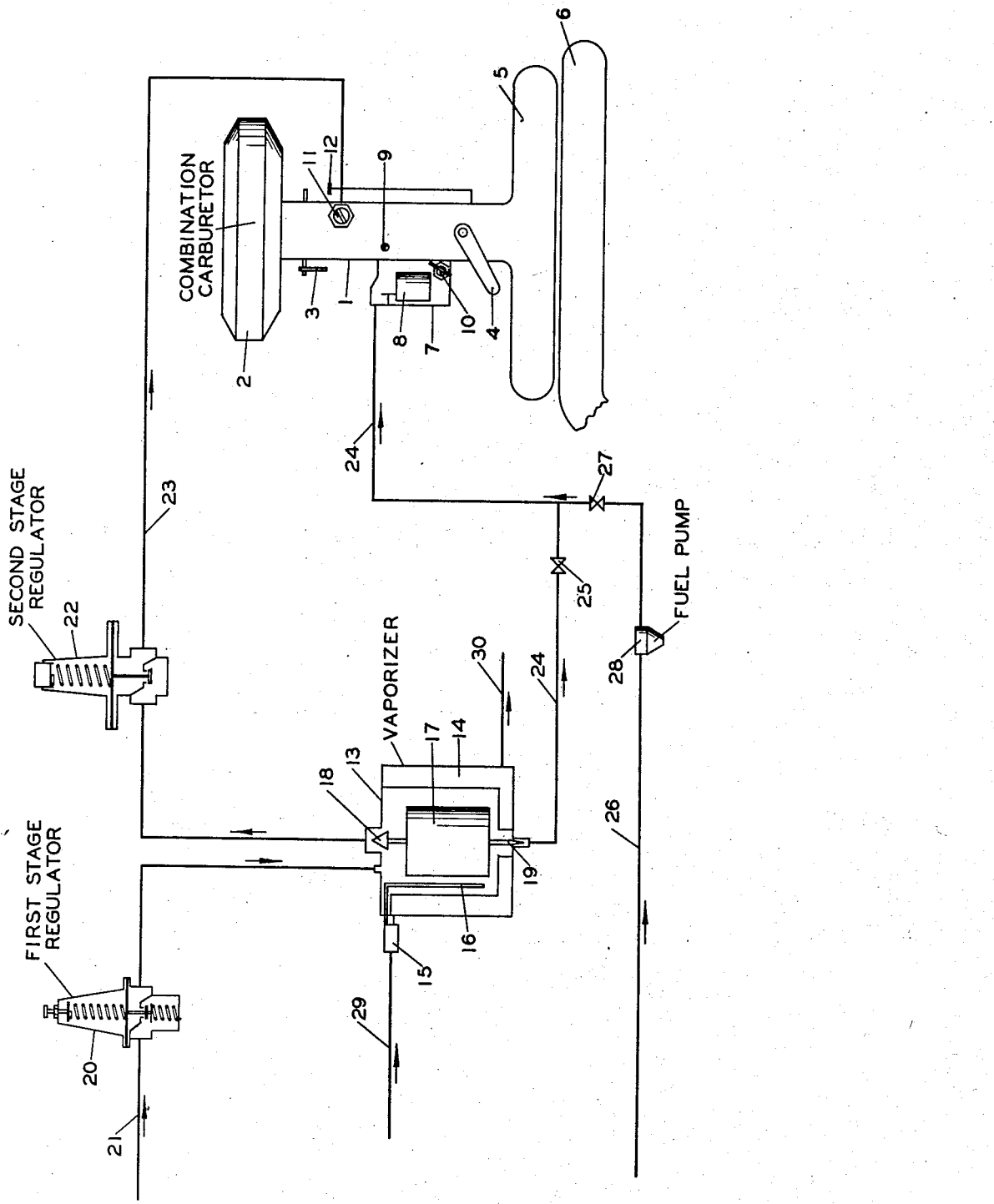
INVENTOR
R. W. THOMAS
BY
Hudson, Young, Shanley + Yinger
ATTORNEY Patented Apr. 6, 1943

2,315,881

UNITED STATES PATENT OFFICE 2,315,881

HIGHER VAPOR PRESSURE FUEL SYSTEM AND COMBINATION CARBURETOR

Rosswell W. Thomas, Bartlesville, Okla., assignor to Phillips Petroleum Company, a corporation of Delaware Application September 9, 1941, Serial No. 410,224

7 Claims. (Cl. 62—1)

This invention relates to a fuel system and combination carburetor arranged therein adapted for handling hydrocarbon fuels having a wide boiling range and more particularly adapted for fuels possessing a higher than normal vapor pressure.

The carburetion of fuels having a higher than normal vapor pressure has constituted a major problem in the automotive industry due to the influence of atmospheric temperature changes and the difficulty of properly proportioning the feed of the respective liquid and gaseous phases to the carburetor under a variety of operating conditions.

Various arrangements have been proposed for handling higher vapor pressure hydrocarbon fuels adapted to meet the inherent difficulties incident to the carburetion of fuels of this type. A system recently proposed in an application to Gerhard Gerson, Serial No. 402,417, filed July 14, 1941, utilizes a vaporizer for separating the fuel into liquid and gaseous components and a regulator controlling the admission of fuel to the vaporizer in response to suction in the carburetor intake tube. The arrangement includes a diaphragm which is connected with the fuel inlet valve and exposed to the pressure of the liquid fuel contained in the vaporizer. Separate passages convey the liquid and gaseous phases from the vaporizer to the carburetor. An automatic valve arrangement is provided in the vaporizer in conjunction with a float to decrease the flow of gaseous phase to the carburetor during existence of a preponderance of liquid phase. This results in feeding more liquid and less gaseous phase fuel from the vaporizer to the carburetor thereby approaching a balanced condition in the vaporizer or in fact proportioning the relative energy input to the carburetor as between liquid phase and gaseous phase in order to maintain an approximately constant liquid level in the vaporizer. The regulator is so adjusted that the pressure of the fuel from the source of supply is reduced to approximately atmospheric pressure on entering the vaporizer. The arrangement also includes a compensator for varying the spring pressure on the diaphragm in response to change in fuel pressure in the supply line, thereby compensating the operation of the pressure reducing valve for variable inlet pressures. An increase in line pressure loads the fuel inlet valve to the vaporizer and tends to maintain a relatively constant outlet pressure.

While the Gerson arrangement has generally proven quite satisfactory, it has been found desirable to provide a more positive means for regulating the pressure of the gaseous phase entering the carburetor. The compensator requires very careful adjustment to obtain a constant zero pressure in the vaporizer. Likewise, pressure fluctuation on the inlet side causes a slight but noticeable variation, even with the compensating device, in outlet pressure in single stage regulation from a relatively high to a low pressure. Also, relatively high under-the-hood temperatures may cause vapor lock in the liquid line to the carburetor. In order to avoid the occurrence of vapor lock, enough vapor must be distilled off in the vaporizer to avoid premature vaporization in the liquid line and liquid bowl on the carburetor at any encountered temperature and pressure. The amount of vapor separated in the vaporizer, however, must be carefully controlled to avoid a high dew point which might result in condensation in the vapor line leading to the carburetor. I have found that the maintenance of a pressure slightly above atmospheric in the vaporizer will tend to prevent the occurrence of vapor lock and at the same time avoid the necessity of a fuel pump which may be necessary in the Gerson arrangement where the vaporizer pressure is substantially atmospheric.

A primary object of the present invention is to provide a fuel supply system which will be reliable, consistent in operation and unaffected by atmospheric conditions or under-the-hood temperatures. A further object is to provide a fuel system which will operate without the aid of a fuel pump while avoiding the occurrence of vapor lock in the liquid line to the carburetor or in the carburetor. A still further object is the provision of a fuel system for the carburetion of multiple phase hydrocarbon fuels of a wide boiling range which will deliver said fuel to the carburetor at substantially constant pressure.

The drawing illustrates diagrammatically a fuel system and combination liquid and gaseous phase carburetor embodying the principles of this invention.

It is the purpose of the present invention to provide an arrangement which will insure the delivery of higher than normal vapor pressure fuel to the carburetor at a positive pressure and at the same time maintain the liquid phase in the vaporizer under sufficient pressure to insure the flow of the liquid phase to the carburetor without the use of a fuel pump or similar arrangement and prevent vapor lock in the liquid line and carburetor bowl. This is accomplished in accordance with this invention in a simple and satisfactory manner by providing a primary or high pressure regulator in the line from the supply tank to the vaporizer to reduce the fuel pressure to a relatively low point above atmospheric pressure and providing a further low pressure regulator effecting pressure reduction of the vapor phase passing to the carburetor to substantially atmospheric pressure. Thus by employing a two-stage pressure reduction it is possible to maintain a positive head of pressure on the liquid fuel in the vaporizer while at the same time insuring a constant pressure of the gaseous phase admitted to the mixing chamber in the carburetor. The arrangement also includes means for automatically controlling the flow of liquid and vapor fuel to the carburetor by a double valve and float structure similar to that employed in the above mentioned Gerhard Gerson application. A conventional float valve is employed in conjunction with the carburetor to regulate the flow of liquid fuel from the vaporizer.

With reference to the drawing, the numeral 1 designates a combination liquid and gaseous phase carburetor of the type shown and described in the Gerhard Gerson application above referred to. An air strainer 2 is connected to the top of the air intake pipe which is also provided with a choke lever 3 and throttle lever 4. The combined liquid and gaseous phase fuel properly proportioned in admixture with air is fed to the internal combustion engine through the intake manifold 5. The engine exhaust manifold is shown at 6 and a chamber 7 provided with a float valve arrangement 8 is secured to the intake pipe for the reception of liquid phase fuel. A liquid idling adjustment screw 9 and liquid main adjustment screw 10 regulates the relative quantity of liquid phase fuel admitted to the gas-air mixing tube 1 and a main vapor adjustment screw 11 and vapor idling adjustment screw 12 regulates the relative quantity of gaseous phase admitted to the mixing tube. A chamber or vaporizer 13 for separating the fuel in the liquid and gaseous phases has a water jacket 14 connected with the water circulating system of the motor and the water jacket is equipped with a thermostatic valve 15. The thermostatic valve is controlled by a thermostat 16 regulating the vaporization temperature to remove enough of the volatile constituents from the fuel so that the liquid will not vapor lock. Water passes into the jacket 14 through line 29 and out through line 30. The vaporizer is equipped with a float 17 having a vapor outlet needle valve 18 and a liquid outlet needle valve 19 automatically controlling the relative flow of liquid and gaseous phase to the carburetor. A high pressure or first stage regulator 20 is provided in the fuel supply line 21 from the tank of the vehicle, not shown. The pressure regulator is of a conventional type adapted for reducing fluid pressure from a relatively high and variable value to a lower pressure slightly above atmospheric. A second stage or zero pressure regulator 22 is located in the vapor line 23 leading to the carburetor. The regulator 22 is preferably of the low pressure responsive type adapted to reduce the pressure of the gaseous phase from slightly above atmospheric to atmospheric pressure or below. A line 24 for the liquid phase leads from the float valve at the bottom of the vaporizer to the carburetor. In some cases it may be desirable to operate solely on normal motor fuel and for this purpose a line 26 is provided connecting line 24 with a source of liquid fuel, not shown. Valves 25 and 27 are provided to shut off the flow of high vapor pressure fuel and revert to normal motor fuel or vice versa. A fuel pump 28 may be provided in the line 26 for regular gasoline. If desired, regular gasoline may be introduced into the vaporizer with the higher vapor pressure fuel.

In operation of the system higher than normal vapor pressure fuel from the tank passes through the first stage regulator 20 whereby the pressure may be reduced to 1 or 2 pounds per square inch above atmospheric pressure and into the vaporizer 13. Separation of the fuel into component liquid and gaseous phases takes place in the vaporizer, the temperature of which is controlled to a constant value by the thermostat 16 and thermostatic valve 15. The thermostat is preferably adjusted to maintain the vaporization temperature at under-the-hood temperature or slightly above, to insure vaporization of all fuel boiling above this temperature and prevent the occurrence of vapor lock in the liquid line to the carburetor or in the carburetor bowl. The vapor phase then flows through the second stage or zero regulator 22 in the line 23 being reduced to substantially atmospheric pressure and thereafter enters the intake tube of the carburetor. The carburetor intake tube is provided with a venturi above the throttle valve having passages communicating with the vapor line adapted to create a suction proportional to engine speed as shown in Figure 4 of the aforementioned Gerson application. The zero regulator must, therefore, be set to shut off the flow at atmospheric pressure or slightly below to prevent leakage when the engine is at rest. Slight suction in the intake tube, however, initiates flow of gaseous fuel to the carburetor. The setting of the primary regulator depends on the installation and should be adjusted to secure a safe throttling control of the carburetor float chamber inlet needle valve against the pressure of the liquid during operation and complete shut-off during standstill. The liquid phase from the vaporizer flows through the passage 24 to the float chamber 7 of the carburetor. The ratio of liquid to gaseous phases flowing to the carburetor is automatically regulated by the vaporizer float and normally will remain fairly constant. Due to the pressure differential existing between the first and second stage regulators the liquid phase is under a positive head of pressure, thus insuring flow of liquid phase to the carburetor.

The system of the present invention is advantageously employed in the carburetion of natural gasoline hydrocarbons such as 26 and 40 pound Reid vapor pressure natural gasoline, propane-butane mixtures or the like. One of the main advantages of the device of this invention over that shown in the aforesaid Gerhard Gerson application is that the vaporizer may be located below the carburetor as the slightly super-atmospheric pressure will push the liquid to the carburetor float bowl even if it is uphill. In the Gerson device the vaporizer must be sufficiently elevated at a higher level than the carburetor float bowl so that the liquid will run to the float bowl by gravity. This is quite important in making installations on trucks and buses where space is limited and one cannot always obtain the most desirable mechanical arrangement and relative location of the various parts.

I claim:

1. In a system for supplying and preparing for use in an internal combustion engine a mixture of hydrocarbon fuels, some of which have higher vapor pressures at ordinary atmospheric temperatures than gasoline, a carburetor, a chamber for separating said mixture into liquid and gaseous phases, separate passages for conveying said liquid and gaseous phases to the carburetor, means in said chamber for automatically controlling the relative flow of said liquid and gaseous phases through said passages, means for effecting a primary pressure reduction on the mixture entering said chamber, and means for further reducing the pressure of the gaseous phase flowing from the chamber to the carburetor.

2. In a system for supplying and preparing for use in an internal combustion engine a mixture of hydrocarbon fuels, some of which have higher vapor pressures at ordinary atmospheric temperatures than gasoline, a carburetor, a chamber for separating said mixture into liquid and gaseous phases, separate passages for conveying said liquid and gaseous phases to the carburetor, means for effecting a primary pressure reduction on the mixture entering said chamber, and means for further reducing the pressure of the gaseous phase flowing from the chamber to the carburetor.

3. The system of claim 1 provided with means for controlling the temperature of separation.

4. The system of claim 1 wherein the pressure reducing means include first and second stage constant pressure regulators.

5. The system of claim 1 wherein the second stage constant pressure regulator is adjusted to substantially atmospheric pressure.

6. The system of claim 1 wherein said means for automatically controlling flow comprise a float provided with valves for regulating the relative flow through said passages.

7. The system of claim 1 wherein said chamber is heated by water from the engine circulatory system.

ROSSWELL W. THOMAS.